Feb. 19, 1935.  C. L. HILL  1,991,898
ELECTRICAL MEASURING SYSTEM
Filed March 12, 1926
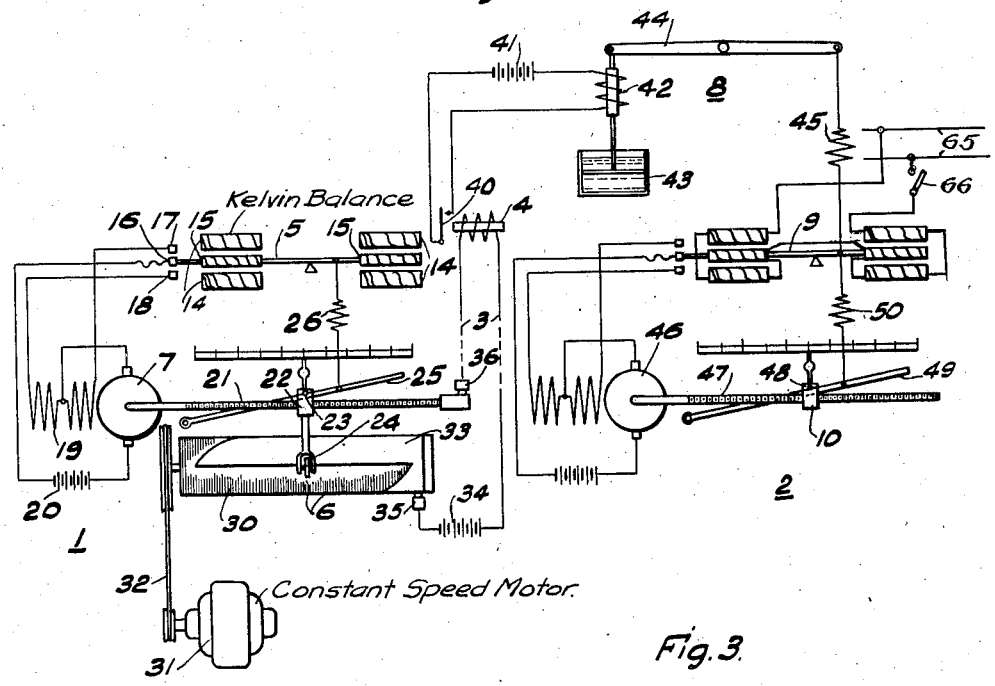
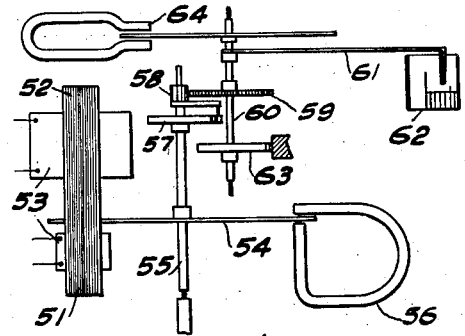
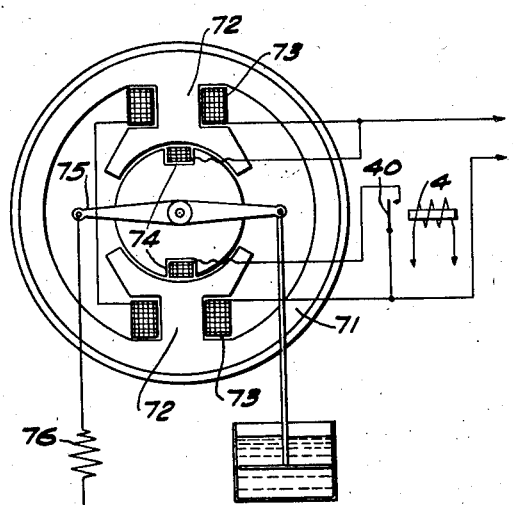
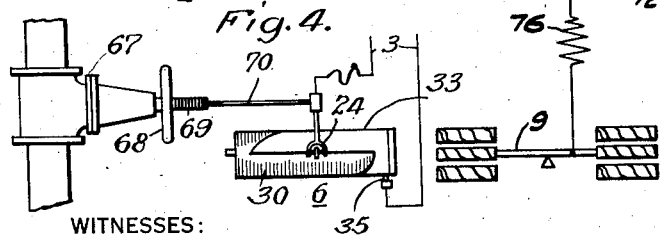
WITNESSES:
INVENTOR
Curtiss L. Hill.
BY
ATTORNEY Patented Feb. 19, 1935

1,991,898

UNITED STATES PATENT OFFICE 1,991,898

ELECTRICAL MEASURING SYSTEM

Curtiss L. Hill, Tacoma, Wash.

Application March 12, 1926, Serial No. 94,195

10 Claims. (Cl. 177—351)

My invention relates to electrical measuring systems and particularly to transmitting systems of the current-impulse type for transmitting measurements and similar variable quantities.

An object of my invention is to provide a measuring system for transmitting variable indications by means of current impulses of a constant rate.

Another object of my invention is to provide a measuring system embodying apparatus for producing constant-rate current impulses of a variable length, in accordance with the magnitude of a variable quantity or the position of a mechanical element, and a remotely-disposed electro-responsive device operated by the current impulses in accordance with said magnitude or position.

A further object of my invention is to provide an improved current-impulse transmitter for electrical measuring systems.

A still further object of my invention is to provide an improved receiving device for current-impulse metering systems that shall give a steady and legible indication of both high and low loads and shall be substantially unaffected by the pulsating or intermittent character of the impulses employed for transmission.

In accordance with my invention, a contact device is arranged to transmit current impulses at a predetermined rate, the length of the impulses being controlled in accordance with the quantity which it is desired to transmit. The contact mechanism preferably comprises a constant-speed rotating commutator or contact device having a linearly adjusted contact member co-operating with an arcuate contact segment, the adjustable contact member being automatically controlled by a motor or similar device.

The receiving device is so arranged that the frequency of the current impulses does not cause appreciable vibration or fluctuation of the indicating element. This result may be readily accomplished for both high and low load indications because the current impulses are transmitted at a constant rate. In addition to the usual damping means, however, a resilient connection is employed between the electro-responsive device actuated directly by the current impulses and the indicating member. Both the electro-responsive device and the indicating member are made sluggish in their response to the actuating forces and, consequently, the effect of the intermittent character of the current impulses is substantially eliminated.

For a clearer understanding of my invention, reference should be had to the accompanying drawing, in which are illustrated preferred embodiments thereof.

Figure 1 of the drawing is a diagrammatic view of an electrical measuring system embodying the invention, Figs. 2 and 3 are views of modifications of the receiving instrument shown in Fig. 1, and Fig. 4 is a diagrammatic view of a modification of the system shown in Fig. 1.

Referring to the drawing, an electrical measuring system comprises a current-impulse transmitting device 1 and a receiving device 2 actuated thereby through a connecting circuit 3 and an impulse relay 4 disposed in said circuit.

The current-impulse transmitting device 1 comprises, in general, a Kelvin balance 5 and contact mechanism 6 controlled by the balance through the instrumentality of a motor 7. The receiving device comprises an electro-responsive element 8 directly controlled by the impulse relay 4, a Kelvin balance 9 and an indicating member 10 controlled by the balance.

The Kelvin balance 5 is of the usual construction and comprises stationary and movable windings 14 and 15, respectively. The windings 14 and 15 are connected to an electrical circuit (not shown), in order to measure any desired electrical quantity of the circuit. The windings are connected in series relation to measure current or voltage or one of the windings, usually the movable winding 15, may be connected in shunt relation to the circuit and the stationary windings connected in series relation to the circuit to measure the power traversing the circuit. Any other usual connections may be employed, the mentioned connections being noted by way of example.

Other electrical or mechanical devices may be substituted for the Kelvin balance when it is desired to transmit other electrical quantities or the position of mechanical elements. For example, the opening of a valve may be transmitted by providing a suitable mechanical connection between the contact mechanism 6 and the valve of such character that the position of the valve determines the adjustment of the contact mechanism.

In order to illustrate the manner in which the invention may be applied for other uses, such, for example, to indicate the position of a valve, there is shown in Fig 4, an arrangement for causing the transmitter 6 of Fig. 1 to transmit impulses of variable length at a constant rate in accordance with the position of a valve 67.

2                                                                                                        1,991,898

In this embodiment the valve is controlled by a hand wheel 68, which may be actuated manually or in any other suitable manner, which actuates the threaded stem 69 to close and open the fluid controlling member (not shown). The movable contact member 24 of the transmitter may be secured to the stem 69, so that any movement of the stem changes the position of the movable contact member which determines the length of the impulse transmitted.

It is to be understood that the movable contact member 24 may be adjusted in accordance with the variations of the quantity or the variations in the position of a mechanical element in any suitable manner.

A contact member 16 is secured to the movable element of the balance and is adapted to co-operate with stationary contact members 17 and 18 when the equilibrium of the balance is disturbed. The contact members 16, 17 and 18 co-operate to control the direction of rotation of the reversible motor 7, the armature of which is connected to the midpoint of its field winding 19 and to a source of current 20. The terminals of the field winding 19 are connected to the contact members 17 and 18 and the contact member 16 is connected to the free terminal of the source of current 20.

The motor 7 is provided with a threaded shaft 21 upon which is disposed a threaded traveler 22, provided with a projecting pin 23 and a contact member 24. The projecting pin 23 is adapted to engage a pivoted arm 25 that is at an angle to the axis of the shaft 21 and is connected through a spring 26 to the movable element of the Kelvin balance 5.

If the electrical conditions in the circuit connected to the Kelvin balance 5 are so altered that the equilibrium of the balance is disturbed, a circuit is closed through the contact member 16 and one of the co-operating contact members for controlling the motor 7. The direction of rotation of the motor 7 is such as to move the traveler 22 in accordance with the change of energization of the Kelvin balance 5 and restore the Kelvin balance to equilibrium by means of the arm 25 and the spring 26. The position of the traveler 22 is, therefore, an indication of the measured quantity and may be calibrated to indicate the value of this quantity.

The position of the contact member 24 is employed to effect the transmission of current impulses which vary in accordance with the quantity being measured. As shown, a rotating drum 30, having its axis parallel to the axis of the motor shaft 21, is provided, the drum being driven by a constant-speed motor 31 through a belt 32. The drum 30 is provided with an arcuate conducting segment 33 arranged to engage the contact member 24 as the contact drum revolves. The period of engagement of the contact member 24 and the contact segment 33 depends upon the position of the contact member 24. Consequently, a series of impulses is produced in the connecting circuit 3 of constant rate and variable length depending upon the magnitude of the quantity being transmitted. The circuit of the impulse relay 4 includes the conductors of the connecting circuit 3, a battery 34, a contact brush 35 engaging the contact drum 30, the segment 33, the contact member 24, the shaft 21 and a contact brush 36 engaging the shaft 21.

The operation of the impulse relay 4 closes a circuit intermittently through its contact members 40, a source of current 41 and the electromagnet 42 of the receiving device. The electromagnet 42, in conjunction with damping means 43, controls, through a lever arm 44 and a spring 45, the average torque upon the Kelvin balance 9. The torque on the Kelvin balance 9 controls a motor 46 provided with a shaft 47 upon which the indicating member 10 is disposed.

The indicating member 10 is provided with a projecting pin 48 co-operating with a pivoted arm 49 to control the Kelvin balance 9 through a spring 50. The operation of the balance and indicating mechanism is the same as that described above in connection with the transmitting instrument. The use of a Kelvin balance 9, as indicated on the drawing, permits the addition of the distant measured load or quantity to a local load. If no addition of loads is desired, the balance 9 may, of course, be replaced by a simple pivoted lever.

As shown in Fig. 1, the balance 9 may be connected, for example, to a circuit 65 to measure the current, voltage, power or any other desired characteristic, by means of the switch 66. When the switch 66 is open the movable element of the balance functions as a pivotally-mounted arm or lever. As illustrated, the balance 9 is connected for measuring voltage, its stationary and movable coils being connected in a well known manner to cause the movable element to rotate about its pivotal support in a counter-clockwise direction, which is the same direction in which the movable element is caused to move under the influence of the lever 44 and spring 45 in response to the impulses received from the transmitting device 1. In this instance, the balance 9 functions both as a measuring instrument and a simple pivoted lever.

As the magnitude or position of the electrical quantity or mechanical element associated with the Kelvin balance 5 changes, the length of the current impulses transmitted over the connecting circuit 3 is changed accordingly. The impulse relay 4 responds to these impulses and energizes the electromagnet 42 in accordance therewith. If the current impulses are short, the electromagnet 42 is only energized a relatively small proportion of the time and the average torque exerted on the Kelvin balance 9 through the spring 45 is small.

If the length of the current impulses increases, the electromagnet 42 is energized a greater proportion of the time and the Kelvin balance 9 is subjected to a greater torque in the counter-clockwise direction. In order to balance the increased torque, the spring 50 is subjected to a greater pull by the lever arm 49, which is effected by the movement of the indicator 10 to the right. The movement of the indicator 10 provides an indication of the changes of magnitude or position transmitted by the transmitting device 1.

The electro-responsive device 8 and the indicator 10 of the receiving device are both sluggish in their response to the current impulses received. The rate of the current impulses may also be relatively large even for small loads or for the zero-position indication. Consequently, the indicator 10 is steady over the entire range of deflection and does not vibrate or fluctuate at certain scale readings, as impulse-controlled devices of the prior art have been found to do.

In Fig. 2 is shown a modification of the receiving instrument comprising an electro-responsive device 51 of the induction type provided with a core member 52 and windings 53 thereon. The windings 53 may be intermittently energized with either alternating or direct current in such manner as to affect the rotation of the disc armature member 54 upon its shaft 55. A damping magnet 56 may be provided for retarding the movement of the armature member 54. The shaft 55 is connected through a coiled spring 57, a pinion 58 and a gear 59 to a shaft 60 upon which an indicating member 61 is mounted. The indicating member 61 is adapted to cooperate with the usual scale 62.

A restoring spring 63 is provided for the indicating member 61. Damping means 64 comprising a damping magnet and co-operating conducting disc, may be provided to retard or control the movement of the indicating member 61. The operation of the armature member 54 and of the indicating member 61 depends upon the average energization of the electromagnet 51, but the response of both members is sluggish on account of the damping means associated with each member.

Furthermore, the provision of a resilient connection between the shafts 55 and 60 serves to reduce, to a large extent, the vibration or fluctuation of the pointer 61 is response to the intermittent energization of the electromagnet 51. If the connecting spring 57 is relatively light and the damping means 64 is relatively strong, the indication is exceedingly steady. The accuracy is not affected in any way by these changes in the construction.

In Fig. 3 is shown a further modification of the receiving instrument. The instrument shown in this figure comprises a motor of the pivoted armature type having a magnetizable field member 71 provided with salient poles 72 and field windings 73 disposed thereon. The armature is provided with a winding 74 connected in series with the contact members 40 of the impulse relay 4 and controls, through the lever arm 75 and spring 76, the average torque imposed upon the Kelvin balance 9. The balance 9 may be arranged to actuate an indicating member in the same manner as described above in connection with Fig. 1.

I am aware that many changes may be made in the construction which I have disclosed herein without departing from the spirit and scope of my invention. Accordingly, I desire that only such limitations shall be imposed upon the invention as are indicated in the appended claims.

I claim as my invention:

1. In a current-impulse transmitting device, in combination, a motor-operated contact drum provided with a contact segment of predetermined shape, an adjustable contact member co-operating with the contact segment of the drum and disposed for movement in a path parallel to the axis of the drum, means including a motor for actuating the adjustable contact member, an electro-responsive measuring device for controlling the energization of the motor for actuating the adjustable contact member, and means actuated in accordance with the movements of the adjustable contact member for causing the electro-responsive measuring device to deenergize the adjusting motor when the adjustable contact member is moved to a position corresponding to the quantity being measured by the measuring device.

2. In a device for transmitting control impulses of direct current, in combination, an electrical measuring device provided with circuit-controlling contact members, a contact-making device comprising a constant-speed drum provided with a contact segment of predetermined shape and an adjustable contact member disposed to cooperate with the drum segment to close an impulse circuit, means including a reversible motor for moving the adjustable contact member in a path parallel to the axis of the drum, a source of power for the motor, means for connecting the motor to the power source and the contact members of the electrical measuring device, whereby the position of said device determines the direction of rotation of the motor, and means actuated by the adjustable contact member for causing the electrical measuring device to interrupt the energizing circuit for the motor when the adjustable contact member has been moved into a position with respect to the drum segment which corresponds to the electrical quantity influencing the electrical measuring instrument 3. Means for transmitting impulses over a control circuit energized from a direct-current source comprising, in combination, a device disposed to measure a predetermined electrical characteristic of a circuit, a contact-making device comprising a drum provided with a contact segment of predetermined shape, means for rotating the drum at a substantially constant speed, and an adjustable contact member disposed to cooperate with the contact segment on the drum, said segment and adjustable contact member being connected in the control circuit, means including a reversible motor controlled by the measuring device for actuating the adjustable contact member in a path parallel to the axis of the drum, and means actuated in accordance with the movements of the adjustable control member for rendering the measuring device operable to effect the operation of the actuating motor to move the adjustable contact member into a position corresponding to the magnitude of the electrical characteristic being measured.

4. In a current-impulse transmitting device, in combination, a contact drum operated at a substantially constant speed and having a contact segment of predetermined shape, an adjustable contact member cooperating with the contact segment of the drum and movable in a path parallel to the axis of rotation of the drum, said contact segment on the drum being of such shape that its engagement with the adjustable contact member occurs periodically but is of variable-duration depending on the position of the adjustable contact member, and means including a measuring device responsive to a predetermined characteristc of a quatity to be measured for determining the position of the adjustable contact member.

5. In combination, an energized circuit means for periodically opening and closing said circuit for variable periods of time comprising a drum rotating at a substantially constant speed and having a contact segment of arcuate shape thereon, an adjustable contact member disposed to engage the drum segment and movable along a path parallel with the axis of rotation of the drum, and means responsive to the magnitude of a predetermined quantity for controlling the position of the adjustable contact member, thereby to provide for transmitting impulses of variable length at a constant rate over the circuit.

6. In a current-impulse transmitting device, in combination, a contact drum provided with an arcuate contact segment, means for driving the drum at a substantially constant speed, an adjustable contact member cooperating with the contact segment of the drum, means for actuating the adjustable contact member along a path parallel to the axis of rotation of the drum and means responsive to a predetermined quantity operable to control the operation of actuating means for the adjustable contact member whereby the position of said contact member along the drum segment is dependent on the magnitude of the quantity.

7. In a current-impulse transmitting device, in combination, a contact drum provided with a contact segment having one edge thereof parallel to the axis of rotation of the drum and the opposite edge of arcuate shape, an adjustable contact member disposed to cooperate with the drum segment to transmit variable length impulses, means for driving the drum at a substantially constant speed, a screw-threaded element for moving the adjustable contact member along a path parallel to the axis of rotation of the drum, and means responsive to the magnitude of a predetermined quantity operative to drive the screw-threaded element.

8. In a current-impulse transmitting device, in combination, a contact drum having a contact segment of predetermined shape, means for driving the drum at a substantially constant speed, an adjustable contact member disposed in cooperative relation to the drum segment to provide for transmitting current impulses at a constant rate but of variable length dependent upon the position of the adjustable contact member, means including a reversible motor for moving the adjustable contact member along a path parallel to the axis of rotation of the drum, and means responsive to the magnitude of a quantity for controlling the operation of the motor thereby to provide for transmitting current impulses at a constant rate but of variable length dependent upon the magnitude of the quantity.

9. In a remote indicating system, in combination, an electro-responsive device for measuring a desired electrical characteristic of an electrical circuit, a remotely-disposed indicating device, an energized control circuit therefor, means controlled by said electro-responsive measuring device for transmitting variable length impulses at a substantially constant rate over the control circuit, said means comprising a constant speed drum element having an arcuate contact segment and a cooperating adjustable contact member movable along a path parallel to the axis of rotation of the drum in accordance with the operation of the measuring device.

10. In a measuring system, in combination, a measuring device responsive to a predetermined characteristic of a quantity to be measured, a remotely disposed indicating device, an energized circuit connecting said measuring and indicating devices, means controlled by said measuring device for transmitting impulses of variable length at a constant rate over the energized circuit, said means comprising a rotatable drum provided with a contact segment, means for rotating the drum at a constant speed, a cooperating adjustable contact member movable along a path parallel to the axis of rotation of the drum, and means controlled by the measuring device for adjusting the position of the adjustable contact member in accordance with the magnitude of the measured quantity, an impulse relay connected to the opposite end of the control circuit, and current-responsive means controlled by the impulse relay for effecting the operation of the indicating device.

CURTISS L. HILL.